United States Patent Office

2,796,936
Patented June 25, 1957

2,796,936

ACIDIZING WELLS

Allyn T. Sayre, Jr., and Orrin C. Holbrook, Crystal Lake, Ill., assignors to The Pure Oil Company, Chicago, Ill., a corporation of Ohio No Drawing. Application July 14, 1954,
Serial No. 443,436

7 Claims. (Cl. 166—42)

This invention relates to the acid treatment of subterranean geological formations. It is especially directed to a manipulative technique for introducing an acidic reagent into a formation whereby the acidic reagent reacts with the formation surfaces thereby reducing the resistance of said formations to the flow of fluids therethrough.

The susceptibility of fluid-bearing geological formations to treatment with chemical reagents has resulted in the development of a number of processes which employ acidic reagents to remedy geological formations having low production rates due to their low permeability or discontinuous porosity. Over the period of time since Frasch in 1896 first utilized hydrochloric acid for the treatment of dolomitic formations, considerable attention has been directed to the application of other acid reagents. In the course of these investigations, other reagents both inorganic and organic have been found which are effective in treating dolomitic or limestone formations. In adidtion the capabilities of other acidic reagents for treating siliceous formations have been appreciated. In general, calcareous and siliceous formations are of a heterogeneous nature and contain a number of constituents such as iron, aluminum, alkali metals and alkaline earth metals. As a result, a problem common to all methods of acidizing is the formation of precipitates within the formation interstices through the action of the acidic treating reagent or its by-products on some precipitate-forming constituent of the formation. Considerable attention has been directed to the mitigation of this problem and a number of remedies have been suggested for application as a pretreatment step or as a concomitant step to be carried out simultaneously with the acidizing. In addition that phase of precipitate formation which occurs as a result of the interaction between the spent treating reagent and the precipitate-forming constituents of the formation has been considered. This invention is concerned with forestalling the detrimental plugging effects resulting from spent acids produced within the formation being treated.

The technique of acidizing was originally carried out by introducing the acid into the formation and allowing it to remain in contact with the formation surfaces for a length of time considered to be sufficient for the acidizing reaction to go to completion. This expedient had inimical effects inasmuch as if the spent acid was allowed to remain in the pore spaces, the danger that insoluble residues or the formation of secondary reaction products which would plug the interstices would occur. As a result, it is now considered good practice to withdraw the spent acid from the formation very quickly after the initial introduction of treating solution. The withdrawal of the acid can be carried out by either natural flow, bailing, swabbing, or pumping. If such expedients are carried out, they give rise to a number of problems such as the necessity for employing additional equipment to effect the removal of the spent acid, the disposal of the spent acid, etc.

It is therefore, an object of this invention to provide a method which will overcome the problems arising from the removal of spent acid from the formation being treated. It is a further object of this invention to provide a means whereby the formation of precipitates caused by the spent acid coming in contact with the various precipitate-forming constituents of the formation is mitigated without regard to the chemical composition of the precipitates.

In accordance with this method, an acid treating reagent is introduced into the formation in any conventional manner to effect the objectives of formation acidizing. Immediately following the introduction of the acid, a displacing fluid is forced into the formation in an amount sufficient to bring about the irreducible saturation (Vide Pirson, Elements of Oil Reservoir Engineering, McGraw-Hill, 1950, page 62) of the spent acid in the formation being treated. This condition of irreducible saturation of the acid in the formation is reached when the saturation with respect to the spent acid phase within the formation is such that the relative permeability to this phase is zero. As a result, the spent acid does not flow back into the well bore thus avoiding the formation of plugging precipitates which would be formed during the return of the spent acid to the well bore for disposal.

In carrying out the instant invention, it is preferred that the acid be introduced into the formation to be treated by means of conventional displacement techniques. One of these techniques involves installing within the well bore a column of tubing extending from the surface or well head to a point adjacent the formation into which the acid is to be applied. This tubing in combination with the tubing head connections at the well head forms an annular space between the tubing and the casing or walls of the borehole. The annular space is then filled with oil and a certain amount is withdrawn from the annular space through suitable outlet positions at the well head by pumping an amount of acid equivalent to the volume of the tubing down to the level of the formation being treated. The annular outlet is then closed. The pumping of the acid is continued which forces the acid into the formation until the desired amount of acid has been introduced. A suitable displacing fluid, such as oil, is then introduced into the tubing and pumped down on top of the acid. The pumping of the oil is continued until all of the acid which is contained in the tubing has been displaced therefrom. It is at this point that the prior art acidizing techniques are stopped and the well put into production. In other words, at this point the oil in the tubing plus the spent acid which has formed in the formation interstices and has flowed into the well bore is removed from the tubing and well bore by the conventional expedients suggested above. The metal conduits, pumps and other equipment which came into contact with the acidizing medium or the spent acid may then be flushed with water or oil or some other flushing medium in order to overcome the corrosive effects of the spent acid. For example, kerosene or other light hydrocarbons are sometimes used either as a solvent or wash prior to the introduction of the acid and also may be employed to help flush out the spent solution and any residues which may have formed therein. In contradistinction to this flushing technique, a so-called "over-displacing fluid" is employed in carrying out this invention. This over-displacing fluid is introduced into the well bore immediately after the desired amount of acid has been forced into the formation and initially functions in the same manner as the hereinbefore mentioned displacing fluid conventionally employed in acidizing techniques. By continuing the pumping, the over-displacing fluid not only forces the acid remaining out of the tubing, but also causes the over-displacing fluid to be forced into the formation. At the same time the acid, more or less spent, is pushed into the formation farther and farther from the well bore. The pumping still continues until a volume of displacing fluid in an amount sufficient to effect irreducible saturation of spent acid in the formation has been injected. In most instances the treating reagent employed will become completely spent in the course of the acidization of the formation being treated. However on occasions where a slower acting acidizing solution has been employed small amounts of unreacted acidic treating reagent will be admixed with the spent reagent. In these cases the formation is irreducibly saturated with the admixture by means of the over-displacement technique encompassed by this invention. Accordingly the expression "spent acidizing reagent" employed in the appended claims is intended to describe the treating reagent remaining in the formation after the acidization of the interval, zone, or stratum to effect a reduction in the flow resistance characteristics has been satisfactorily completed. This includes not only completely spent treating reagent but also solutions which may contain small amounts of unreacted reagent. The amount of over-displacing fluid which must be used to bring about the irreducible saturation of the formation with the "spent treating reagent" will of course depend upon the lithological characteristics of the formation such as porosity, permeability, and capillary pressure. Generally, it has been found that 2 to 4 volumes of displacing fluid, based on the volume of acid injected, will effectively bring about this condition. However, formation conditions may exist wherein amounts as small as 1 volume or as great as 5 volumes of oil may be required although amounts in excess of this may be required in certain instances. The displacing fluid may be any fluid which will have an inert effect on the formation. Although it is preferred to employ a crude mineral oil or any of the distillates obtained therefrom, compressed gas may be also used as the displacing fluid in gas wells or where oil is not readily available. In certain instances it may also be permissible to employ water. However, its use is to be avoided in the application of the invention to oil producing formations to avoid attendant emulsification difficulties, clay swelling, or precipitation due to dilution of spent acid.

In carrying out the acidization and subsequent introduction of the over-displacing fluid, any conventional well treating techniques may be employed such as the use of packers in various arrangements for selectively treating adjacent producing formations. In addition, an acid jet gun may be used in the acidizing phase of this invention to selectively treat a producing formation. Also precautions may be taken in instances where it is desired to confine the introduction of the acid to the less permeable strata of a formation interval. This may be accomplished with the aid of sealing agents which temporarily seal the more permeable strata before the acid is employed.

In a specific embodiment of the instant invention, an oil well (containing 15 feet of productive pay sand) producing from a sandstone formation at a depth of 8,000 feet is acidized with 100 gallons of 25% di-fluorophosphoric acid per foot of pay sand, or a total of 1500 gallons. After the total amount of acid solution has been injected into the tubing, it is displaced from the tubing into the sand with an inert fluid, such as fuel oil, etc. The resulting spent acid mixture in the formation then is displaced away from the well bore with more fuel oil injected into the tubing. This over-displacement with fuel oil is continued until about 4500 gallons have been forced into the formation. Such a volume of over-displacement fuel oil reduces the degree of spent acid saturation in the reservoir to its irreducible saturation value; that is, the degree of saturation at which the spent acid will not flow back into the well bore. The well is swabbed to remove fuel oil from the formation and bring the well back to producing oil. With the total fluid production about 100 bbls./day at a tubing pressure of 750 p. s. i. g. before acidizing, an oil production rate of about 250 bbls./day at the same tubing pressure can be realized after acidizing in accordance with the foregoing procedure.

It will be noted in the foregoing illustrative example that fluophosphoric acid was employed as the acidizing medium in treating a siliceous formation. However, it is to be understood that this invention has application to the treating of other types of formations as well as the utilization of other treating reagents to which these formations are susceptible. Other acids which present the problem of the formation of residues from spent acids include hydrofluoric, hydrochloric, fluoboric, mixtures of hydrochloric and inorganic fluorides, or other acids which have a tendency to form insoluble precipitates when in contact with the formation. In carrying out the acidizing phase of this invention, the amounts of acid employed are those which would normally be employed in acidizing process.

As in the conventional acidizing of geological formations it is necessary to make lithological studies of the formations which are to be acid treated. This can be done by making a detailed geological inspection of the cores of the formation. Information relative to the formation conditions which must be understood will be provided by this study in order to effect a successful acidization.

Although the foregoing example is directed to the acidization of an oil bearing geological formation, the instant invention also may be utilized in treating other types of fluid-bearing reservoirs such as those containing gas or water.

It is thus seen that by carrying out the improvement in acid treatment of a geological formation in accordance with this invention, the over-displacing fluid introduced into the formation brings about the saturation of spent acidizing reagent in the formation to a point where the acid phase will become discontinuous and will not flow back into the well. This is known as the point of irreducible saturation where the spent acidizing reagent is retained on the surfaces within the formation and resists removal therefrom by conventional flow systems. This condition avoids the formation of oil- and water-insoluble precipitates which normally would be formed when the spent acidizing reagent is allowed to return to the well bore for disposition in accordance with conventional practice.

Accordingly, we claim as our invention:

1. In the acidizing of subterranean geological formation to reduce the resistance of said formation to fluid flow therethrough wherein an acidizing reagent capable of reacting with the constituents of the formation is forced into the formation, reacts therewith, and produces a spent acidizing reagent which has a tendency to react further with the constituents remaining in said formation to produce water and oil insoluble precipitates, the method of mitigating the plugging effect of said precipitates in the formation interstices which comprises introducing into the formation subsequent to the forcing of substantially all of the acidizing reagent into said formation an inert over-displacing fluid in a volume not less than the volume of acidizing agent employed and in an amount sufficient to effect the irreducible saturation of said formation with said spent acidizing reagent.

2. A method in accordance with claim 1 in which the over-displacing fluid is a petroleum oil.

3. A method for acidizing subterranean geological formation traversed by a bore hole with an acidizing agent to reduce the resistance of said formation to the flow of fluids therethrough which comprises positioning a tubing within said well bore, introducing into the tubing an acidizing reagent capable of reacting with the constituents of the formation to produce a spent treating reagent, forcing the acidizing reagent down the tubing into the formation until an amount of acid sufficient to increase the permeability of the formation has entered the tubing, displacing the acid from the tubing by admitting a displacing fluid into said tubing whereby the acidizing reagent contained in said tubing is emptied into the formation and thereafter introducing into the formation through the tubing an inert over-displacing fluid, the amount of over-displacing fluid employed being in a volume not less than the volume of acidizing agent employed and sufficient to effect the irreducible saturation of said formation with the spent acidizing reagent produced by the interaction of said acidizing reagent and said formation.

4. A method in accordance with claim 3 in which the displacing fluid and over-displacing fluid is the same substance.

5. A method in accordance with claim 4 in which said fluid is a petroleum oil.

6. A method for acidizing subterranean siliceous geological formation traversed by a bore hole with a fluophosphoric acid containing acidizing reagent to reduce the resistance of said formation to the flow of fluids therethrough which comprises positioning a tubing within said well bore introducing a fluophosphoric acid containing-acidizing reagent capable of reacting with the constituents of the formation to produce a spent acidizing reagent, forcing the acidizing reagent down the tubing and into the formation until an amount of acid sufficient to increase the permeability of the formation has entered the tubing, displacing the acid from the tubing by admitting a displacing fluid into said tubing whereby the acidizing reagent contained in said tubing is emptied into the formation and thereafter introducing into the tubing a petroleum oil over-displacing fluid, the amount of over-displacing fluid employed being a volume not less than the volume of acidizing agent employed and sufficient to effect the irreducible saturation of said formation with the spent acidizing reagent produced by the interaction of said acidizing reagent and said formation whereby the precipitate forming tendencies of said spent acidizing reagent is mitigated.

7. A method in accordance with claim 6 in which the amount of over-displacing fluid employed is about equal to 2–4 volumes per volume of said acidizing reagent forced into said formation.

References Cited in the file of this patent

UNITED STATES PATENTS

| | | |
|---|---|---|
| 556,669 | Frasch | Mar. 17, 1896 |
| 2,308,414 | Campbell | Jan. 12, 1943 |
| 2,640,810 | Cardwell et al. | June 2, 1953 |
| 2,672,936 | Bond | Mar. 23, 1954 |

OTHER REFERENCES

Acidizing Handbook, Kingston. Copyright 1947 by Gulf Pub. Company; pp. 56, 57 and 58.